United States Patent [19]
Steiner

[11] 3,787,136
[45] Jan. 22, 1974

[54] ADJUSTABLE TORQUE CONTROLLED TOOL HOLDER

[75] Inventor: Rudolph Steiner, Fairport, N.Y.

[73] Assignee: Numertap, Inc., Rochester, N.Y.

[22] Filed: Jan. 2, 1973

[21] Appl. No.: 320,623

[52] U.S. Cl............. 408/139, 10/141 H, 10/135 R, 192/56 R, 192/30 W
[51] Int. Cl........................................ B23b 47/24
[58] Field of Search 408/139, 129; 10/141 H, 135 R, 10/129 R, 89 H; 192/56 R, 30 W; 64/29

[56] References Cited
UNITED STATES PATENTS
3,521,314   7/1970   Steiner.............................. 408/139

Primary Examiner—Gil Weidenfeld
Attorney, Agent, or Firm—Shlesinger, Fitzsimmons & Shlesinger

[57] ABSTRACT

The holder has a shank to be driven by a machine spindle, a sleeve axially slidable on the shank and rotatable thereby, and an adapter removably connected to the sleeve for rotation thereby. The adapter carries a removable tool, and is releasably coupled to the sleeve by a spring-loaded torque ring, which is axially slidable on the sleeve and holds a plurality of ball couplers resiliently in driving engagement with recesses in the adapter. When a predetermined torque is exceeded the balls are forced out of the recesses to interrupt the drive to the adapter, and also to force the torque ring upwardly to inoperative or released position. The sleeve is held in released position by a ball coupling which is engaged in stepped angularly and longitudinally spaced recesses in the sleeve.

10 Claims, 6 Drawing Figures

ADJUSTABLE TORQUE CONTROLLED TOOL HOLDER

This invention relates to tool holders, and more particularly to an improved torque limiting holder for taps, drills, reamers, and the like.

Prior tool holders of the type described incorporate either a releasable coupling for automatically disconnecting the drive from the machine spindle to the tool, whenever the torque that is applied by the spindle to the tool exceeds a predetermined value; or they provide for manual, individual adjustment of the amount of torque to be delivered for the particular types of tool mounted in the holder.

A major disadvantage of most such prior holders is that, because the releasable coupling is sping-loaded, it tends alternately to disrupt and re-engage the drive between the spindle and tool. This produces excessive wear and tear on the coupling, and causes the holder to be extremely noisy in operation.

A further disadvantage of prior such holders has been the difficulty in precisely adjusting the maximum torque transmittable by the spindle to the tool holder.

Furthermore, prior methods of holding the tools and adjusting the maximum torque level for the particular type and/or size of tool used causes time-consuming limitations in the utilization of the machines on which the tools are employed.

In my prior U.S. Pat. No. 3,521,314, issued July 21, 1970, there is described a tool holder that eliminated many of the disadvantages of prior art devices. The invention disclosed herein is an improvement over the invention of this prior patent as will be apparent hereinafter.

One object of this invention is to provide an improved tool holder of the character described which will obviate need for manual torque adjustment.

Another object of the invention is to provide a tool construction with which vibration and chatter are reduced, as compared with prior tools of the character described when the maximum torque level set for the tool is exceeded.

Another object of this invention is to provide for a tool holder at the type described improved coupling means, which automatically is released and latched in its released position to prevent drive between the associated drive spindle and the tool, each time the holder's maximum transmittable torque has been exceeded.

Another object of the invention is to provide a tool holder of the character described which will have extended life.

Still another object of the invention is to provide a tool holder of the character described which will avoid damage to the tool or to a workpiece from jarring or vibration. To this end a further object of the invention to provide a construction which will permit mounting a tool such as a reamer to be floating and self centering.

Other objects in the invention will be apparent hereinafter from the specification and from the recital of the appended claims, particularly when read in conjunction with the accompanying drawings.

Figure 1:
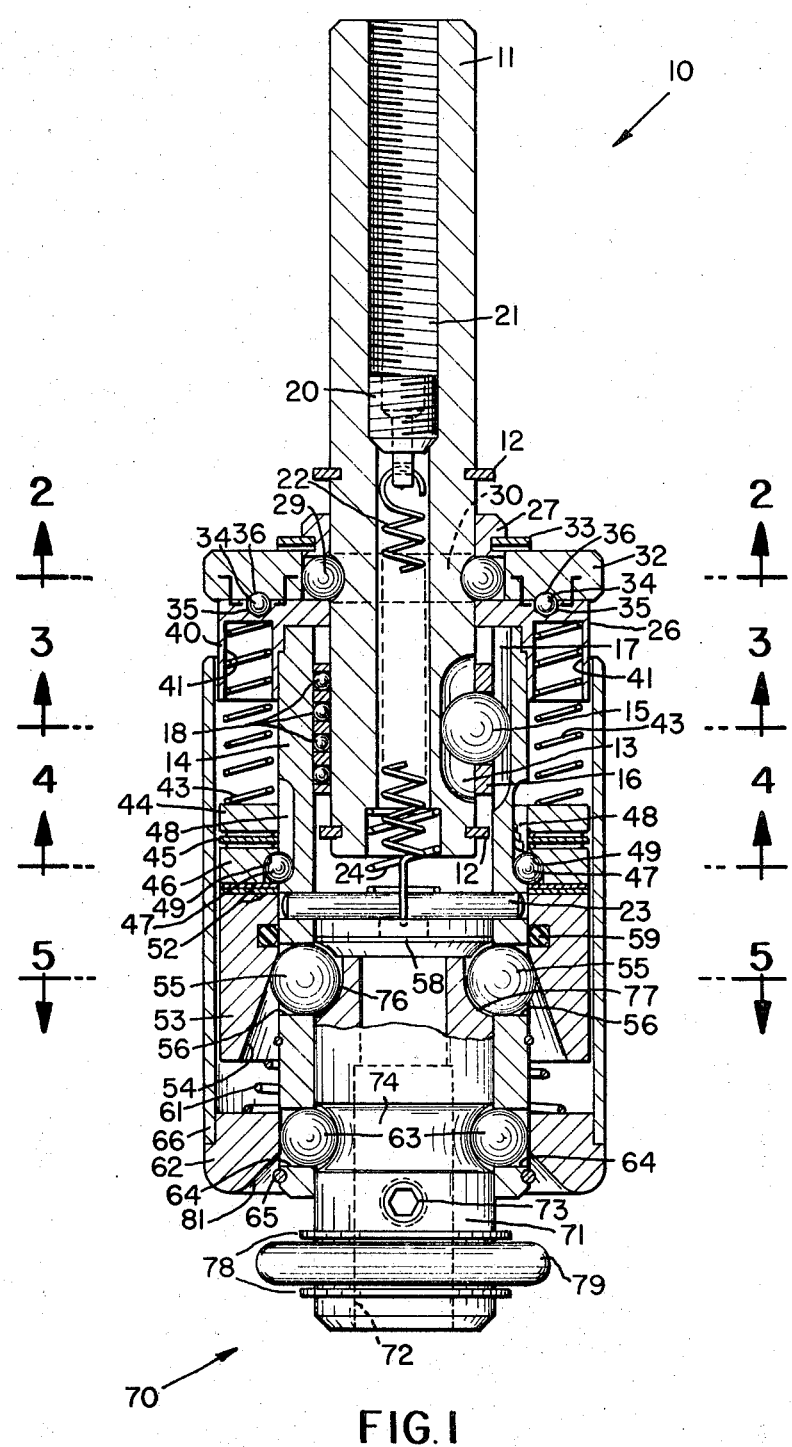
FIG. 1 is a generally axial sectional view of a tool holder made according to one embodiment of this invention, parts thereof being shown in full and others in section.

Referring now to the drawings by numerals of reference, 10 denotes generally the tool holder, and 11 its drive or shank portion, the upper end of which is adapted to be removably chucked in the spindle of a drill press, or like machine for rotation thereby. At its lower end shank 11 projects coaxially into the upper end of a sleeve 14, which has an inner diameter larger than the outer diameter of the shank. Sleeve 14 is drivingly connected to shank 11 by a relatively large ball 15, which is carried in a race 16 that surrounds shank 11. Ball 15 is housed partly in an axially extending groove 13 formed in the outer periphery of shank 11, and partly in a groove 17 formed in the inner peripheral surface of sleeve 14. Also housed in the annular wall of race 16 are a plurality of smaller ball bearings 18, which have rolling engagement with the confronting peripheral surfaces of shank 11 and sleeve 14, so that sleeve 14 is axially slidable on shank 11 between axially spaced stop rings 12, which are secured on the shank.

Secured at its upper end to a screw 20, which is adjustably threaded in an axial bore 21 in shank 11, is a tension spring 22, the lower end of which is secured to a pin 23 that extends transversely across sleeve 14 beneath the lower end of shank 11. Spring 22 resists movement of the sleeve 14 downwardly on shank 11, but is counteracted slightly by a compression spring 24, which seats at one end against the pin 23 and at its opposite end in a counterbore in the lower end of shank 11.

The upper end of shank 11 passes slidably through an annular cap 26, which is secured over the upper end of sleeve 14 coaxially thereof. Cap 26 has a reduced diameter upper end 27 containing four, equi-angularly spaced radial openings 28, (FIG. 2) each of which houses a radially movable ball 29, which also engages in an annular groove 30 in shank 11. A locking ring 32 is rotatably mounted on the upper end 27 of cap 26 for rotation coaxially thereof and is secured thereon by spring clamp 33. Interposed between ring 32 and cap 26 are four small ball detents 34 (FIGS. 1 and 2), which are seated in four recesses 35 formed in the top of cap 26 at equi-angularly spaced points around its axis. Eight equi-angularly spaced dimples 36 are formed in the bottom of ring 32 for selective registry with detents 34.

When ring 32 is disposed in its locking position (FIGS. 1 and 2), its inner peripheral surface maintains the ball detents 29 in engagement with groove 30 in the shank 11, thereby preventing axial movement of sleeve 14 and cap 26 relative to shank 11. In this position detents 34 project into four of the dimples 36 (FIG. 2), whereby the ring 32 is releasably held against rotation.

Figure 2:
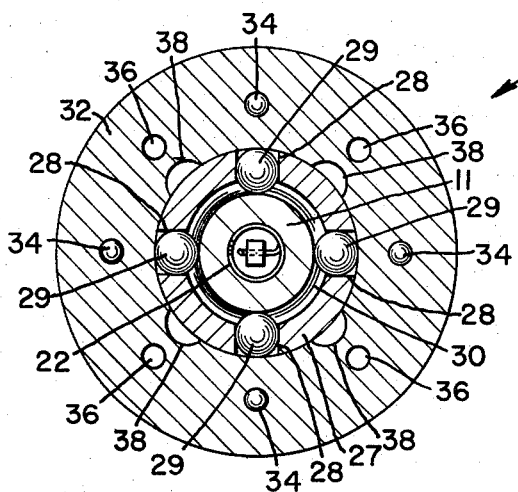
FIG. 2 is a sectional view taken along the line 2—2 in FIG. 1 looking in the direction of the arrows.
Figure 3:
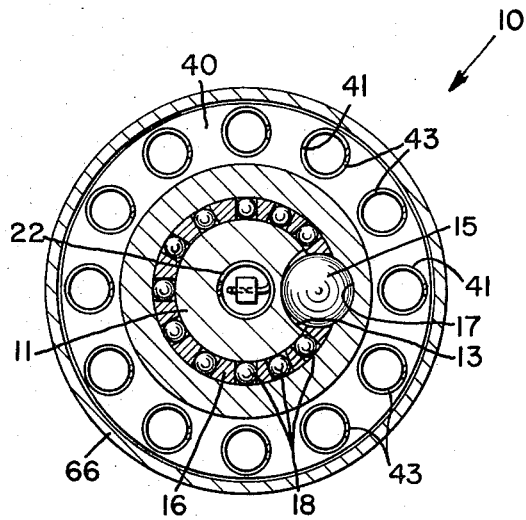
FIG. 3 is a sectional view taken along the line 3—3 in FIG. 1 looking in the direction of the arrows.
Figure 4:
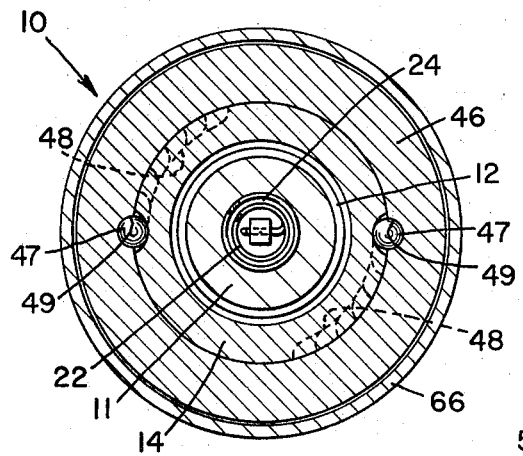
FIG. 4 is a sectional view taken along the line 4—4 in FIG. 1 looking in the direction of the arrows.
Figure 5:
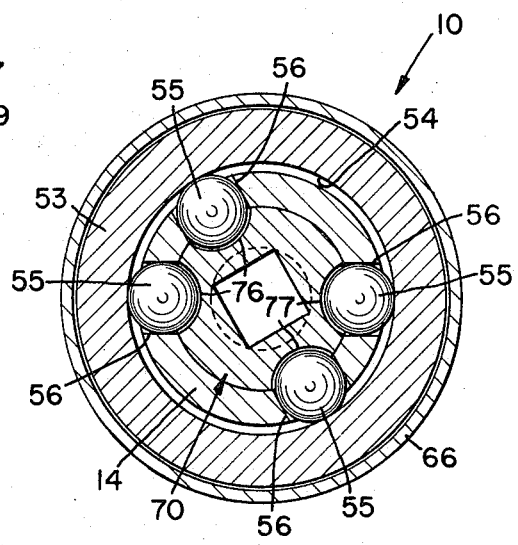
FIG. 5 is a sectional view taken along the line 5—5 in FIG. 1 looking in the direction of the arrows.

Sleeve 14 and its cap 26 can be released for limited axial movement on shank 11 by manually rotating ring 32 approximately 45° about its axis from the position illustrated in FIG. 1, in which case the four detents 29 will move radially outwardly from groove 30 into engagement with the four equi-angularly spaced recesses 38 (FIG. 2) in the inner peripheral surface of the ring 32. When ring 32 is in its released position, the other four recesses 36 in the underside thereof will be in registry with the ball detents 34 releasably to hold the ring in this alternative position.

Cap 26 has an annular skirt portion 40, which surrounds the upper end of sleeve 14 coaxially thereof, and which has in its underside, in the embodiment illustrated, 12 cylindrical pockets 41, which are disposed in equi-angularly spaced relation about the axis of the cap parallel thereto. Compression springs 43 are seated at their upper ends in the pockets 41, and engage at their lower ends against an axially slidable spacer ring 44, which is supported on the outside of sleeve 14 by a thrust bearing 45. Bearing 45, which also is axially slidable on sleeve 14, is seated against a retainer ring 46, which is mounted for limited axial movement on the outside of sleeve 14 intermediate its ends.

Downward movement of retainer ring 46 on sleeve 14 is limited by a pair of ball detents 47, which are interposed between ring 46 and the sleeve 14 to project partway into diametrally-opposed slots 48 formed in sleeve 14, and part way into diametrally-opposed recesses 49, formed in the bore of ring 46.

Figure 6:
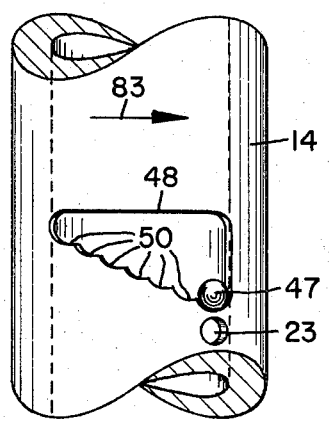
FIG. 6 is a fragmentary side view of the sleeve which forms part of the coupling mechanism of this holder and showing the ball detent for retaining the tool in released position.

As shown more clearly in FIG. 6, the slots 48 are generally triangular in shape and the lower wall defining the hypotenuse of each slot 48 is inclined to the vertical, and has therein a plurality of vertically and angularly spaced notches 50 to receive the detents 47.

Ring 46 and the two ball detents are supported on a pair of washers 52, which are mounted on the upper end of a torque ring 53, which is mounted for limited axial sliding movement on the outside of sleeve 14. In its lower portion ring 53 has a conical bore 54, which has sliding engagement with four balls 55 that are housed in radial openings 56 in sleeve 14 for limited radial movement between the inclined bore 54 and a thrust bearing 58 that is mounted in sleeve 14 between pin 23 and the balls 55. The compression springs 43 urge rings 44, 46 and 53 downwardly to their limit positions in FIG. 1, whereby the inclined bore wall 54 on ring 53 urges the balls 55 resiliently and radially into the bore in sleeve 14 to the limits permitted by the thrust bearing 58. A resilient O-ring 59, which is mounted in a circular groove in the bore of ring 46 and which bears against the sleeve 14, creates friction between ring 53 and sleeve 14, keeping sleeve 14 in its released position against the force of gravity, reducing the noise level.

Fastened at its upper end on the outside of sleeve 14 beneath the apertures 56 is a compression spring 61, the lower end of which is seated against a quick-release ring 62, which is axially slidable on the lower end of sleeve 14. Spring 61 normally holds sleeve 62 in its lowermost position (FIG. 1), wherein the inner peripheral surface of this ring engages a pair of ball detents 63 that are mounted for limited radial movement in a pair of radial openings 64 formed in sleeve 14 just above a stop ring 65, which is fastened on the lower end of sleeve 14 to limit downward movement of ring 62. Ring 62 also carries an elongate cover sleeve 66, which fastened coaxially on the upper end of sleeve 62, and which extends slidably upwardly around the outside of the skirt 40 on cap 26 to enclose most of the holder.

Releasably secured in the lower end of the sleeve 14 by the ring 62 and ball detents 63 is the adapter 70, comprising a cylindrical body portion 71 having an axial bore 72, and a set screw 73 adjustably threaded radially in the body portion to secure the shank end of a drill, tap, or like tool (not illustrated) in the adapter. Intermediate its ends body 71 has in its outer surface a circumferential, arcuate-profiled groove 74, in which the ball detents 63 engage, when the adapter is fully seated in the lower end of sleeve 14. In its upper end each adapter 70 is provided with two pairs of diametrally opposed notches or grooves 76 and 77, which extend from the upper end of the adapter downwardly a distance approximately equal to the diameter of a ball 55. When the adapter 70 is inserted into sleeve 14, these recesses 76 and 77 receive portions of the balls 55 drivingly to connect the adapter to sleeve 14.

Rotatably mounted on the lower end of adapter 70 between a pair of axially spaced shoulders or rings 78, is a handling ring 79, which permits the adapter 70 to be inserted or withdrawn from driving engagement with the sleeve 14 even while the latter is rotating.

In use, shank 11 is secured in the spindle of a drill press, or the like. To mount a tap or other tool in the spindle, the tool, for example, may be first secured in the adapter and then the adapter may be mounted in the sleeve 14 by pressing the quick-release ring 62 and sleeve 66 axially upwardly against the resistance of spring 61 until the conical surface 81 in the lower end of the ring registers with the detents 63 to permit the latter to move radially outwardly. When balls 55 enter the notches 76 and 77 in its upper end, and its groove 74 registers with the detents 63, spring 62 is released to lock the adapter in sleeve 14.

Assuming that the adapter 70 has a tap secured therein, and that it is desirable to permit sleeve 14 to "float" axially relative to shank 11, the operator manually rotates ring 32 to place the recesses 38 in the ring in registry with the ball detents 29, thereby unlocking ring 32 from the shank. The machine spindle (not illustrated) may then be lowered to engage the tap (not illustrated) with the workpiece. The shank 11, which is driven by the tool spindle, drivingly rotates sleeve 14 through the agency of ball 15; and sleeve 14 drivingly rotates adapter 70 and its tap through the agency of the ball detents 55. As the tap threads into the work, the adapter 70 and sleeve 14 are drawn as a unit downwardly on the shank 11 against the resistance of spring 22 is known manner.

When the tap bottoms, or the maximum torque as determined by the springs 43 is exceeded, the sleeve 14, which continues to rotate, will cause the balls 55 to be urged radially out of the recesses 76 and 77, in the adapter 70, thus interrupting the drive to the adapter. When these balls 55 are forced radially outwardly against the conical surface 54 on ring 53, they cause this ring to be shifted axially upwardly and to rotate in the opposite direction against the resistance of springs 43. The upward movement of ring 53 shifts the ring 46 and the associated ball detents 47 axially and rotatably upwardly on sleeve 14 until each detent 47 seats in the next upper notch 50 in the associated recess 48. Thus, whenever the torque ring 53 is shifted upwardly in response to an excessive torque, the detents 47 will become seated in another of the vertically spaced notches 50 in its associated slot 48, depending upon the amount of vertical shifting movement imparted to ring 53. Then, as long as sleeve 14 continues to rotate in the direction indicated by arrow 83 (FIG. 6), the detents 47 will hold rings 46 and 53, respectively, in upper or released positions preventing these detents from chattering in notches 76, 77, when the notches register with detents 55 twice per revolution of sleeve 14.

To restore the detents to driving engagement with the adapter 70, the rotation of the drive spindle is reversed so that detents 47 will return by spring pressure to the lowermost notches 50 in slots 48, and will thereby allow springs 43 to return retainer ring 46 and torsion ring 53 to their lowermost positions (FIG. 1).

It will be apparent that the maximum torque transmittable by the balls 55 to adapter 70 can be altered by reducing the diameter of the upper end of the adapter, correspondingly reducing the radial depth of the grooves 76 and 77, and consequently reducing the effort required to dislodge the detents 55 from these grooves.

From the foregoing it will be apparent that the instant invention provides a novel tool holder having compact and reliable means for releasably latching the tool coupling in released position, when the maximum transmittable torque for the holder is exceeded, thus minimizing wear and chatter. Moreover, by proper selection of the diameter of the upper end of the adapter 70 and the disposition of the notches 50 in each recess 48, any one of a plurality of different adapters can be employed to provide different, predetermined transmittable torques therefor. In each case, when the selected maximum torque is exceeded, the latching detents 47 will engage in the appropriate notches 50 in the recesses 48 to hold the retainer and torque rings 46 and 53 in their upper or released positions, so that the detents 55 will remain out of driving engagement with the associated adapter 70 until the apparatus is reset by reversing the rotation of sleeve 14. The ratchetting sound that occurs as the balls 47 are driven upwardly along their associated notches 50 will warn the operator that maximum torque has been exceeded.

The tension in spring 22, which resists the floating movement of sleeve 14, can be readily adjusted by screw 20. When sleeve 14 is "floating" on the shank 11, it will be apparent that the stop rings 12 limit the overall axial movement of the sleeve and its cap 26 on the shank. Moreover, if instead of employing a tap in the holder 70 it is desired to use a drill or reamer, then the sleeve 14 can be locked against axial movement on the shank 11 merely by rotating ring 32 approximately 45° until it is returned to the position illustrated in FIGS. 1 and 2, wherein its inner peripheral surface holds the detents 29 in locking engagement with the groove 30 in the shank.

A further advantage of the instant invention is that, the several compression springs 43 provided a more even distribution of the resilient axial force that tends to maintain the balls 55 coupled to, or in driving engagement with, the adapter 70. This minimizes the possibility of any undesirable binding of the axially slidable rings 46 and 53, and results in more precise transmission of maximum torque.

Although only one embodiment of this invention has been illustrated and described in detail herein, it will be apparent that the application is capable of further modification, and this application is intended to cover any modification thereof which would fall within the scope of the invention or the appended claims.

Having thus described my invention, what I claim is:

1. A rotary tool holder, comprising
   a rotary driving member,
   a first driven member
   means connecting said first driven member to said driving member for rotation thereby,
   a second driven member adapted to hold a tool,
   means for releasably coupling said second driven member to said first driven member for rotation thereby about a common axis, including at least one coupling element mounted on one of said driven members for limited movement into and out of driving engagement with the other of said driven members,
   resilient means normally forcing said coupling element into its operative position,
   means for camming said element into an inoperative position out of driving engagement with said other driven member, whenever the torque transmitted from said first to said second driven member exceeds a predetermined value, and
   means operable automatically and releasably for removing the force of the resilient means from the coupling element to allow said element to remain in its inoperative position each time it is moved thereto.

2. A rotary tool holder as defined in claim 1, including means mounting said retaining means for operation, when said first driven member is rotated in one direction, and for effecting release of said retaining means and returning said element to its operative position, when said first driven member is rotated in the opposite direction.

3. A rotary tool holder as defined in claim 1, wherein
   said coupling element is movable radially of said axis between its operative and inoperative positions,
   said resilient means comprises an operating member reciprocable parallel to said axis, and a spring normally urging said operating member against said element to hold said element resiliently in its operative position,
   second camming means formed on the confronting surfaces of said element and said operating member and urging said operating member to inoperative position, when said coupling element is moved to its inoperative position by the first-named camming means, and
   said retaining means includes means interposed between said operating member and said spring releasably to remove the force of said spring from said operating member each time said operating member is moved to its inoperative position.

4. A rotary tool holder as defined in claim 1, wherein
   said resilient means comprises a spring-loaded ring reciprocable axially on said one driven member, and normally urging said element resiliently to its operative position,
   said retaining means comprises a detent mounted on said ring for movement on said one driven member, and projecting into a recess in said one driven member,
   one side of said recess is inclined to the direction of reciprocation of said ring and has therein a plurality of spaced notches, and said detent is seated in one of said notches, when said coupling element is in its operative position, and is seated releasably in another of said notches to hold the detent and said ring in retracted positions on said one driven member, when said coupling element is shifted to its inoperative position.

5. A rotary tool holder, comprising a rotary driving member, a driven member, means for transmitting the rotation of said driving member to said driven member, a third member for holding a tool, means for releasably coupling said third member to said driven member for rotation thereby about a common axis, including a plurality of coupling members mounted on one of the two releasably coupled parts for limited movement into and out of driving engagement in a plurality of cooperating recesses in the other of said two releasably coupled parts, resilient means normally forcing said coupling members resiliently into driving engagement in said recesses, means on said other part for camming said coupling members out of said recesses and into inoperative positions when the torque transmitted from said driven member to said third member exceeds a predetermined amount, thereby to allow rotation of said driven member relative to said third member, and means for releasably removing the force of said resilient means from said coupling members each time the transmitted torque exceeds said predetermined amount.

6. A rotary tool holder as defined in claim 5, wherein said driven member is a sleeve surrounding one end of said third member, said one end of said third member is cylindrical and has said recesses formed in its peripheral surface, said coupling members are movably mounted in a plurality of radial holes in said sleeve, a spring-loaded ring is axially slidable on said sleeve, and has an internal conical surface engaging said coupling members resiliently to hold them seated in said recesses, whereby when said torque exceeds said predetermined amount, said coupling members are forced out of said recesses onto said peripheral surface of said third member, and radially outwardly against said conical surface with sufficient force to shift said ring axially in one direction on said sleeve, and said force removing means comprises means responsive to the movement of said ring in said one direction automatically to retain said ring releasably in any one of a plurality of different inactive positions on said sleeve, depending upon the axial distance said ring is moved in said one direction by said coupling members.

7. A rotary tool as defined in claim 6, wherein said force removing means comprises a second ring slidable on said sleeve between the first-named ring and its associated spring, a ball detent secured at one side in a recess in one of the two confronting surfaces on said second ring and said sleeve, respectively, and projecting into a second recess in the other of said confronting surfaces, said second recess being bounded along one side thereof by a stepped surface inclined to the axis of said sleeve, and having therein a plurality of spaced notches engageable with said detent to secure said second ring in one of a plurality of inactive positions in which said second ring releasably withholds the force of said spring from said first-named ring.

8. A rotary tool as defined in claim 7, wherein a pair of said detents are secured in recesses formed in the inner peripheral surface of said second ring at diametrally opposite sides thereof, and a pair of said second recesses are formed in the outer peripheral surface of said sleeve at diametrically opposite sides thereof to register with said detents.

9. A rotary tool as defined in claim 5, wherein said driving member is a shaft, which is adapted to be secured to the spindle of a machine, said driven member is a sleeve axially slidable on said shaft between first and second limit positions, a tension spring is secured at opposite ends thereof to said shaft and said sleeve, respectively, to resist axial movement of said sleeve downwardly on said shaft, and normally urging said sleeve to one of its limit positions, and means is interposed between said shaft and said spring for adjusting the tension in said spring.

10. A rotary tool as defined in claim 6, wherein a collar surrounds said sleeve adjacent one end thereof, a plurality of axially-extending compression springs are equi-angularly spaced around the outside of said sleeve, and said springs are seated at one end in recesses in said collar and at their opposite ends are operatively connected to said ring resiliently to urge the latter towards its active position against said coupling elements.

* * * * *